(12) United States Patent
Shi et al.

(10) Patent No.: US 8,949,731 B1
(45) Date of Patent: Feb. 3, 2015

(54) INPUT FROM A SOFT KEYBOARD ON A TOUCHSCREEN DISPLAY

(71) Applicant: VMware, Inc., Palo Alto, CA (US)

(72) Inventors: Kun Shi, Beijing (CN); Bo Liu, Beijing (CN); Wenlong Shao, Beijing (CN)

(73) Assignee: VMware, Inc., Palo Alto, CA (US)

( * ) Notice: Subject to any disclaimer, the term of this patent is extended or adjusted under 35 U.S.C. 154(b) by 166 days.

(21) Appl. No.: 13/713,498

(22) Filed: Dec. 13, 2012

(51) Int. Cl.
*G06F 3/048* (2013.01)
*G06F 3/0487* (2013.01)

(52) U.S. Cl.
CPC .................................... *G06F 3/0487* (2013.01)
USPC .......................................................... 715/773

(58) Field of Classification Search
CPC ...................................................... G06F 3/0219
USPC .......................................................... 715/773
See application file for complete search history.

(56) References Cited

U.S. PATENT DOCUMENTS

| | | | |
|---|---|---|---|
| 8,633,901 B2 * | 1/2014 | Orr et al. | 345/173 |
| 2006/0097983 A1 * | 5/2006 | Haggman et al. | 345/156 |
| 2008/0266263 A1 * | 10/2008 | Motaparti et al. | 345/169 |
| 2011/0307822 A1 * | 12/2011 | Park et al. | 715/773 |
| 2012/0130546 A1 * | 5/2012 | Matas et al. | 700/276 |
| 2012/0326984 A1 * | 12/2012 | Ghassabian | 345/168 |

* cited by examiner

*Primary Examiner* — Omar Abdul-Ali

(57) ABSTRACT

Input from a keyboard of a computing device may include displaying a character associated with a key depending on whether the user single-tapped or double-tapped the key. A single touch on the key may cause the computing device to display an initial character that is associated with the key. A double touch on the key may cause the computing device to display an alternate character that is associated with the key.

16 Claims, 10 Drawing Sheets

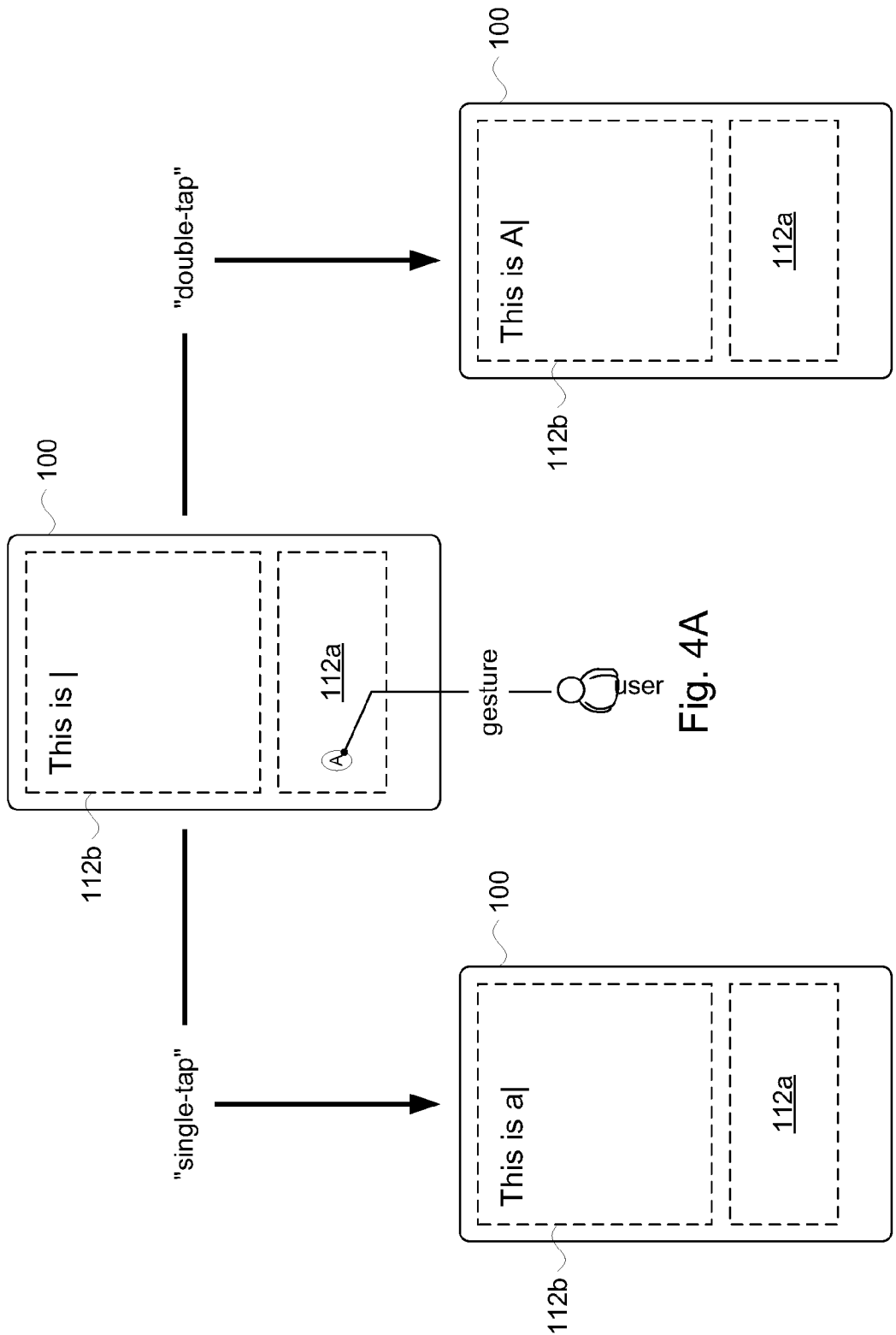

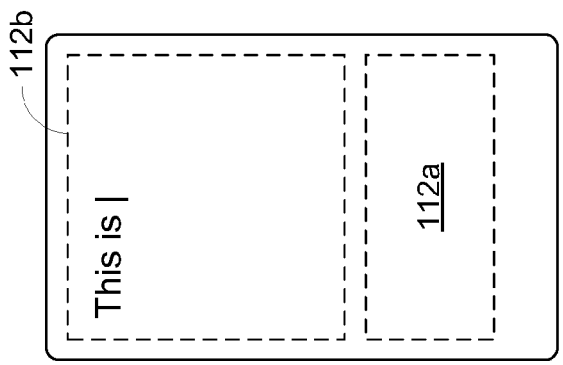
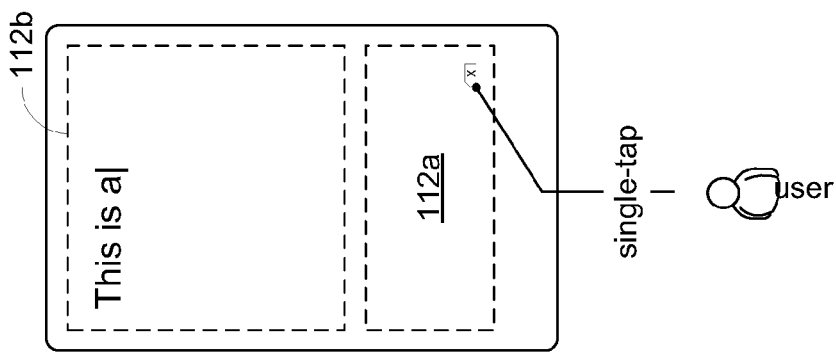
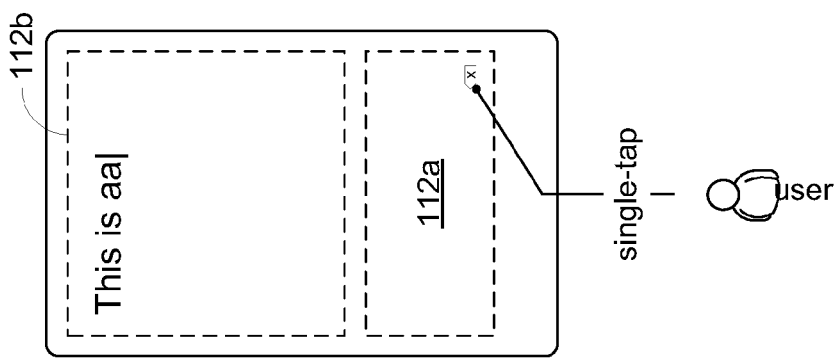
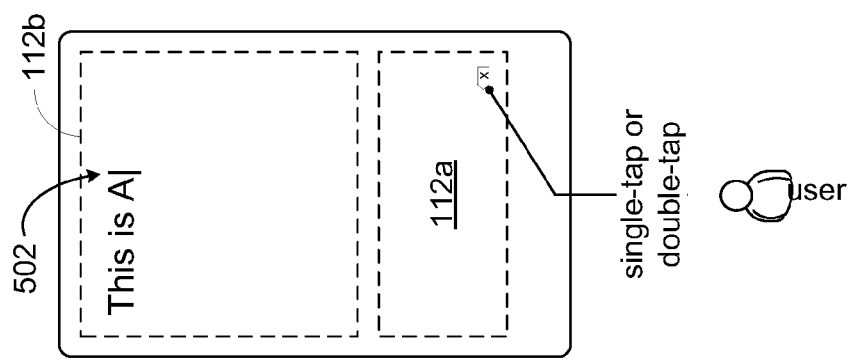

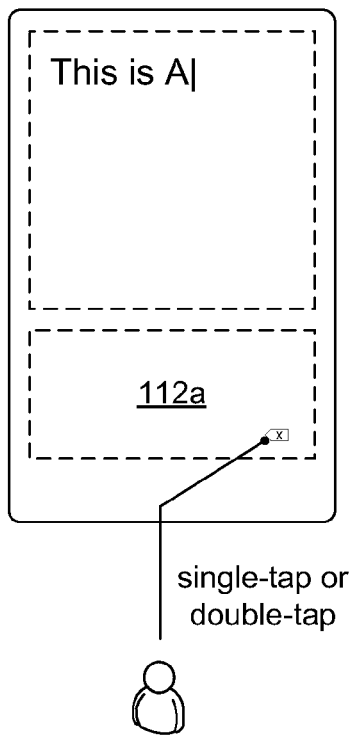
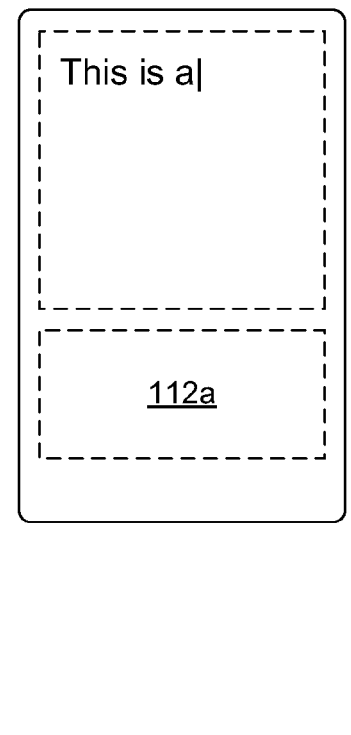
Fig. 6A                              Fig. 6B
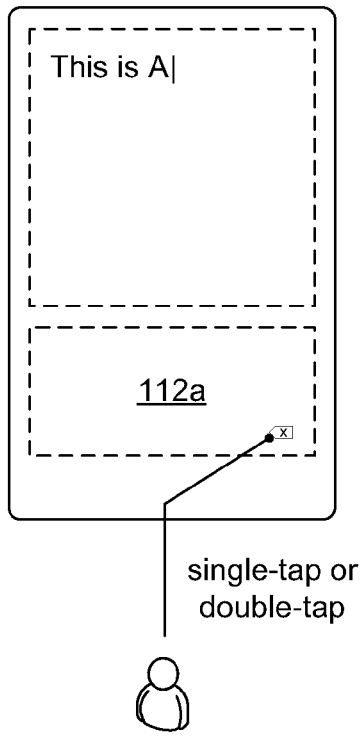
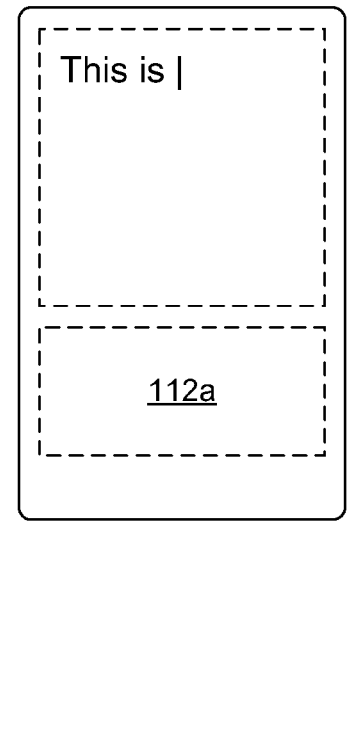
Fig. 7A                              Fig. 7B

INPUT FROM A SOFT KEYBOARD ON A TOUCHSCREEN DISPLAY

BACKGROUND

Portable computing devices (e.g., smartphones, computer tablets, etc.) typically employ touchscreen displays, which serve the dual purpose of providing output to the user and receiving input from the user. The use of a touchscreen display avoids the need for a hard keyboard, allowing instead the use of a soft (virtual) keyboard.

A common experience encountered by users of soft keyboards is the inputting of uppercase characters, which requires the use of a SHIFT key. In some embodiments, the SHIFT key may be indicated by the use of letters such as SHIFT or by the use of a symbol such as an up-arrow. Typically, the user must first tap the SHIFT key in order to turn on capital mode, and then tap the letter. In some cases, the user must tap the SHIFT key a second time in order to turn off capital mode; while in other cases, capital mode is turned off after the user taps the letter. Operating a soft keyboard can be a challenging experience for some users, and the additional finger or thumb movements to operate the SHIFT key can exacerbate the experience in terms of slowing down the user, creating error-prone situations, and the like.

SUMMARY

In some embodiments, a computing device having a keyboard may detect a single touch action on a key of the keyboard. The computing device may display an initial character in response to detecting the single touch. The computing device may detect a double touch action on the key, and in response may display an alternated character.

The computing device may perform backspace processing on a displayed character. If the displayed character is an initial character, then the computing device may perform first backspace processing. If the displayed character is an alternate character, then the computing device may perform second backspace processing.

BRIEF DESCRIPTION OF THE DRAWINGS

FIGS. 4A-4I illustrate examples of processing single-tap gestures and double-tap gestures.

FIGS. 5A-5D illustrate examples of backspace processing in accordance with some embodiments.

FIGS. 6A, 6B, 7A, and 7B illustrate examples of backspace processing in accordance with other embodiments.

DETAILED DESCRIPTION

Figure 1:
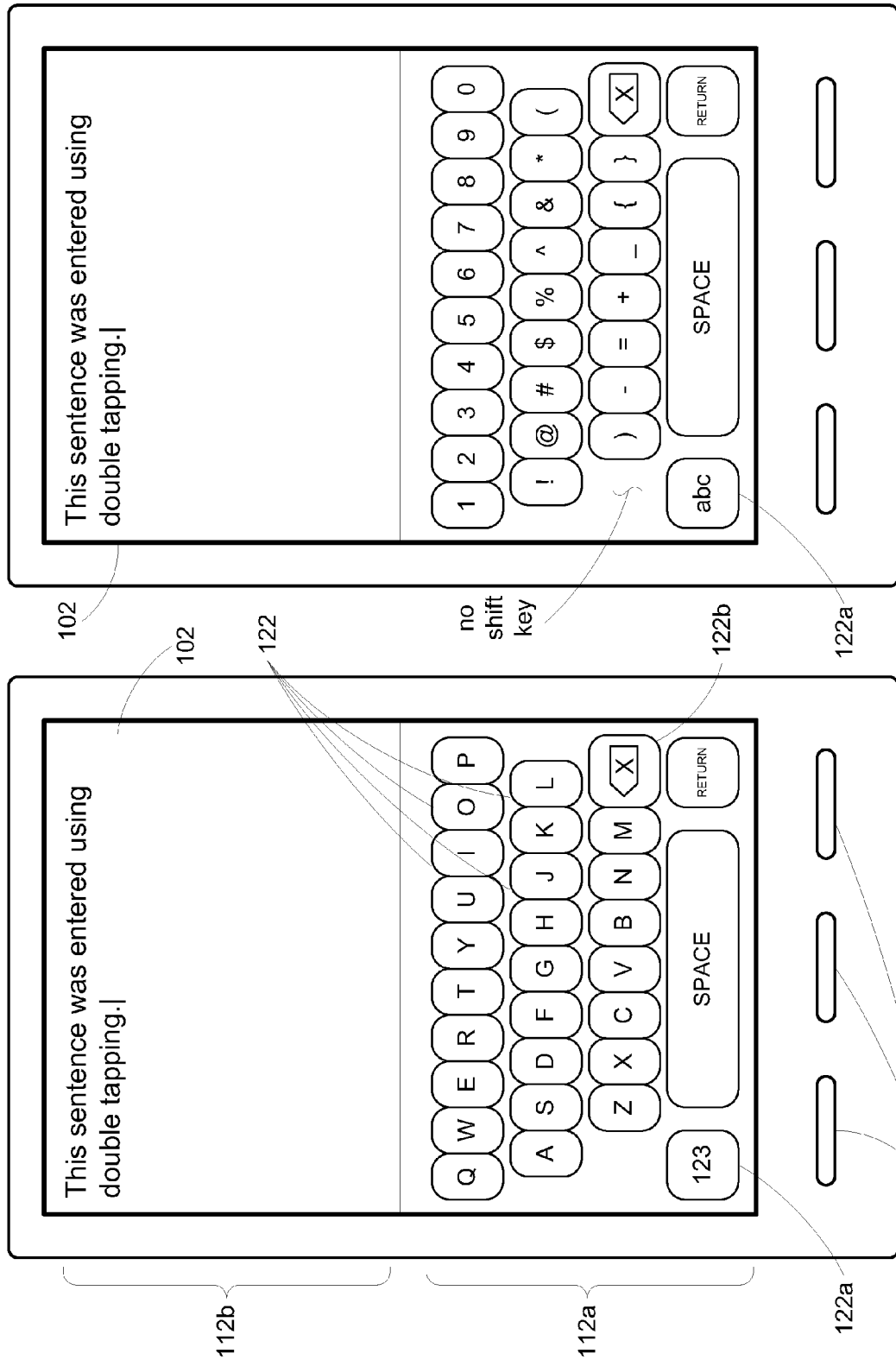
FIGS. 1A and 1B illustrate examples of a virtual keyboard in accordance with the present disclosure.

In the following description, for purposes of explanation, numerous examples and specific details are set forth in order to provide a thorough understanding of embodiments of the present disclosure. Particular embodiments as expressed in the claims may include some or all of the features in these examples alone or in combination with other features described below, and may further include modifications and equivalents of the features and concepts described herein.

Referring to FIGS. 1A and 1B, a computing device 100 in accordance with the present disclosure may include a touchscreen display 102. The computing device 100 may include hardware buttons 104 to provide certain functionality such as sleep mode, power on, etc. In various embodiments, the computing device 100 may be a smartphone, a computer tablet, or other mobile computing device.

The touchscreen display 102 may be used for receiving input to the computing device 100 and for displaying output from the computing device. The touchscreen display 102 may display a soft (virtual) keyboard 112a and a display area 112b, for example, to receive text input from a user. The soft keyboard 112a may comprise softkeys 122, such as letter keys for inputting letters of the alphabet. So-called "white space" keys may be included such as a SPACE bar, a RETURN key, and the like. The soft keyboard 112a may include a selector key 122a that allows the user to display an alternate soft keyboard. In FIG. 1A, for example, the touchscreen display 102 displays a soft keyboard 112a comprising largely of letter keys. If the user taps on the selector key 122a, then the touchscreen display 102 may re-display the soft keyboard 112a to present a soft keyboard having numeric and other character keys, such as illustrated in FIG. 1B for example.

In some embodiments, the soft keyboard 112a may omit the SHIFT key for inputting capital letters and other "shift" characters, relying instead on inputting shift letters in accordance with principles of the present disclosure. FIG. 1A illustrates an example where a user has typed in a sentence in which the first letter is capitalized despite the omission of the SHIFT key in the soft keyboard 112a. It will be appreciated of course that, in other embodiments, the soft keyboard 112a may retain the SHIFT key.

Figure 2:
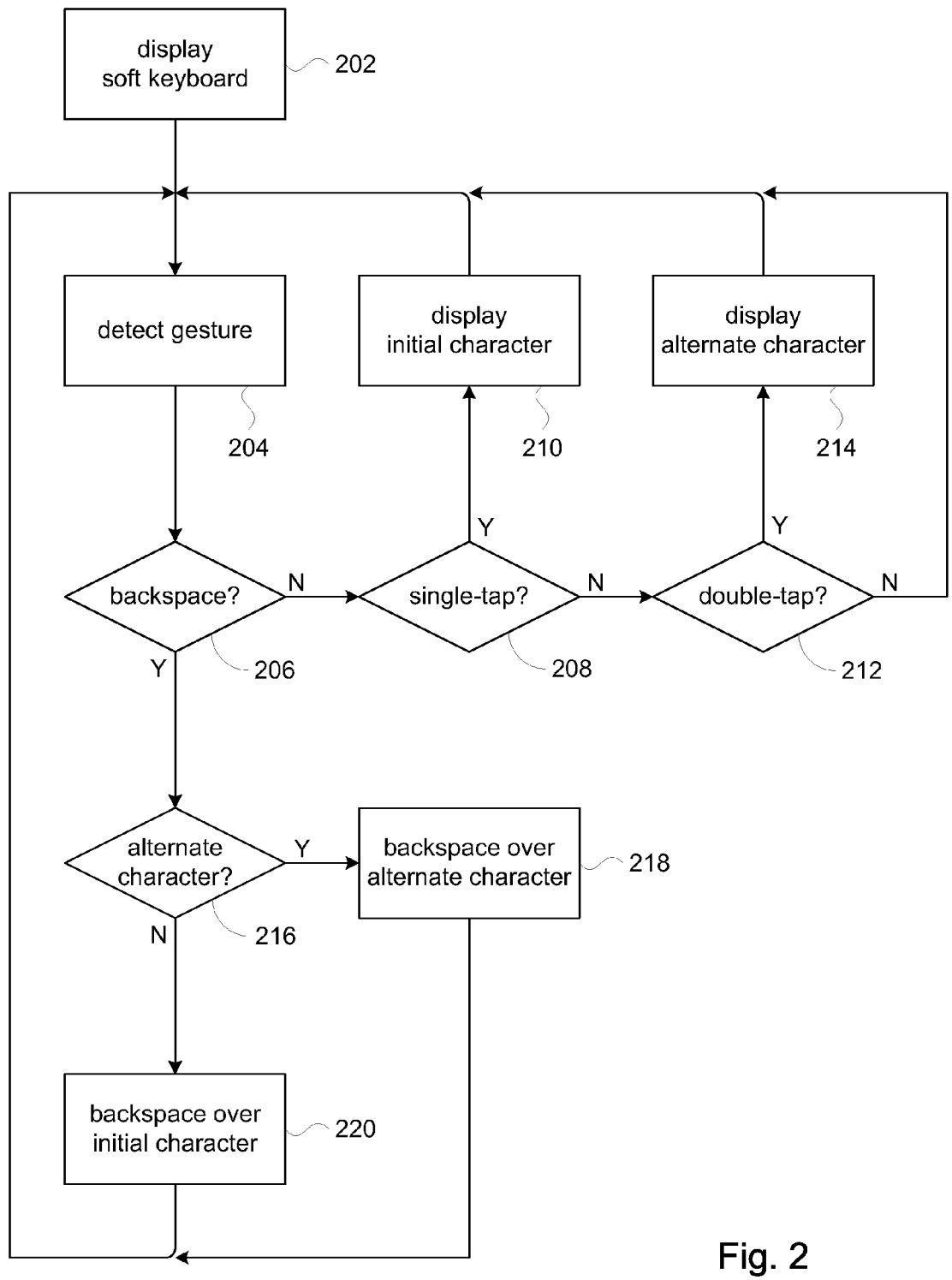
FIG. 2 illustrates processing in accordance with some embodiments of the present disclosure.

FIG. 2 illustrates an embodiment of a process flow in the computing device 100 in accordance with the present disclosure for receiving input from a soft (virtual) keyboard (e.g., 112a). At 202, the computing device 100 may display a soft keyboard 112a on the touchscreen display 102. For example, if the user is composing an email, the computing device 100 may display the soft keyboard 112a for inputting characters and a display area (e.g., 112b) for displaying the user's input.

At 204, the computing device 100 may detect a gesture performed by the user on a softkey of the soft keyboard 112a. In some embodiments, the gesture may be a "tap" gesture, in which the user momentarily touches an area of the touchscreen display 102; e.g., momentarily touching where the softkey is displayed. The tap gesture may be a single-tap gesture or a double-tap gesture. A single-tap gesture may be single touch on the touchscreen display 102. A double-tap gesture may be two consecutive touches on the touchscreen display, separated in time by a predetermined period of time called the double-tap delay. As will be discussed below, a user may configure a value for the double-tap delay.

At 206, the computing device 100 may determine whether the gesture was made on a BACKSPACE key (e.g., 122b, FIG. 1). In some embodiments, the BACKSPACE key may be indicated by the use of letters such as BACKSPACE or DELETE (e.g., 922, FIG. 9) or symbolically such as shown in FIG. 1. If the gesture was not made on a BACKSPACE key, then at 208, the computing device 100 may determine whether the gesture was a single-tap gesture, and if so, then at 210, the computing device may display on the touchscreen device 102 an "initial" character that is associated with the softkey on which the gesture (detected at 204) was made. For example, if the softkey is a letter key (e.g., 'a'-'z'), then the initial character that the computing device 100 displays on the touchscreen device 102 may be a lower case representation of the letter corresponding to the letter key. If the softkey is a non-letter key, then the initial character that the computing device 100 display may be the character that is associated with the non-letter key. Processing from 210 may loop back to 204 for the next detected gesture.

If, at 208, the gesture is not a single-tap gesture, then at 212 the computing device 100 may determine if the gesture is a double-tap gesture, and if so, then at 214, the computing device may display on the touchscreen device 102 an "alternate" character that is associated with the softkey on which the gesture (detected at 204) was made. For example, if the softkey is a letter key (e.g., 'a'-'z'), then the alternate character may be the upper case of the letter. Accordingly, at 214, the computing device 100 may display on the touchscreen device 102 an upper case representation of the letter associated with the letter key. If the softkey is a non-letter key, then the alternate character may simply be the character that is associated with the non-letter key and the computing device 100 may display that character. Processing from 214 may loop back to 204 for the next detected gesture.

In some embodiments, a non-letter key may be associated with two different characters. For example, some non-letter keys may be associated with two related characters such as '+' and '−', '(' and ')', and so on. Thus, for instance, if a non-letter key is associated with the characters '[' and ']', then the character '[' may be referred to as the initial character and the character ']' may be referred to as the alternate character. Suppose, for example, a softkey is associated with initial character '{' and with alternate character '}'. If the user performs a single-tap gesture on the softkey, then at 210, the computing device 100 may display initial character '{'. On the other hand, the user performs a double-tap gesture on the softkey, then at 214, the computing device 100 may display on the touchscreen device 102 the alternate character '}'. Since the upper case representation of a letter may be obtained using the double-tap gesture in accordance with the present disclosure (and similarly with non-letter keys), it can be appreciated that the SHIFT key may therefore be omitted from the soft keyboard 112a as illustrated in FIGS. 1A and 1B.

Continuing with FIG. 2, if at 212, the gesture is not a double-tap gesture, then the computing device 100 may perform a default action. For example, in the process flow shown in the figure, the computing device 100 ignores the gesture detected at 204 and the process flow returns to 204 for the next detected gesture. In other embodiments, for example, the default action may be to display the initial character associated with the softkey on which the gesture was made.

Returning to 206, if the gesture (detected at 204) was made on a BACKSPACE key, then the computing device 100 may perform backspace processing in accordance with the present disclosure. If the reading direction is left to right, backspace processing involves backspacing over the character that is to the left of the current position of the cursor (e.g., 502, FIG. 5A). Conversely, if the reading direction is right to left, backspace processing involves backspacing over the character that is to the right of the current position of the cursor. At 216, the computing device 100 may determine whether the displayed character to be backspaced over is an alternate character (e.g., displayed per processing at 214). If so, then at 218, the computing device 100 may backspace over the displayed alternate character in accordance with the present disclosure in a manner that will be explained in more detail below. Processing from 218 may loop back to 204 for the next detected gesture.

If, at 216, the displayed character is an initial character (e.g., displayed per processing at 210), then at 220, the computing device 100 may backspace over the displayed initial character. In some embodiments, for example, this may involve deleting the displayed character from the touchscreen display 102. Processing from 220 may loop back to 204 for the next detected gesture.

In accordance with the present disclosure, backspacing over a character that was displayed in response to a double-tap gesture, namely the alternate character, may be processed in any of several ways. In some embodiments, for example, the alternate character may simply be deleted from the touchscreen display 102. In other embodiments, the alternate character may be replaced with its corresponding initial character. For example, upper case 'A' (the alternate character) may be replaced by lower case 'a' (the initial character). In still other embodiments, the alternate character may be replaced with two instances of the initial character. For example, if the alternate character is an upper case 'A', then the upper case 'A' may be replaced by "aa" (two instances of the initial character). This may be appropriate when the user intended to input two of the same letter (e.g., the word "roof" has two o's), but had tapped out the letters too quickly such that the computing device 100 detected a double-tap gesture instead of two single-tap gestures.

Figure 3:
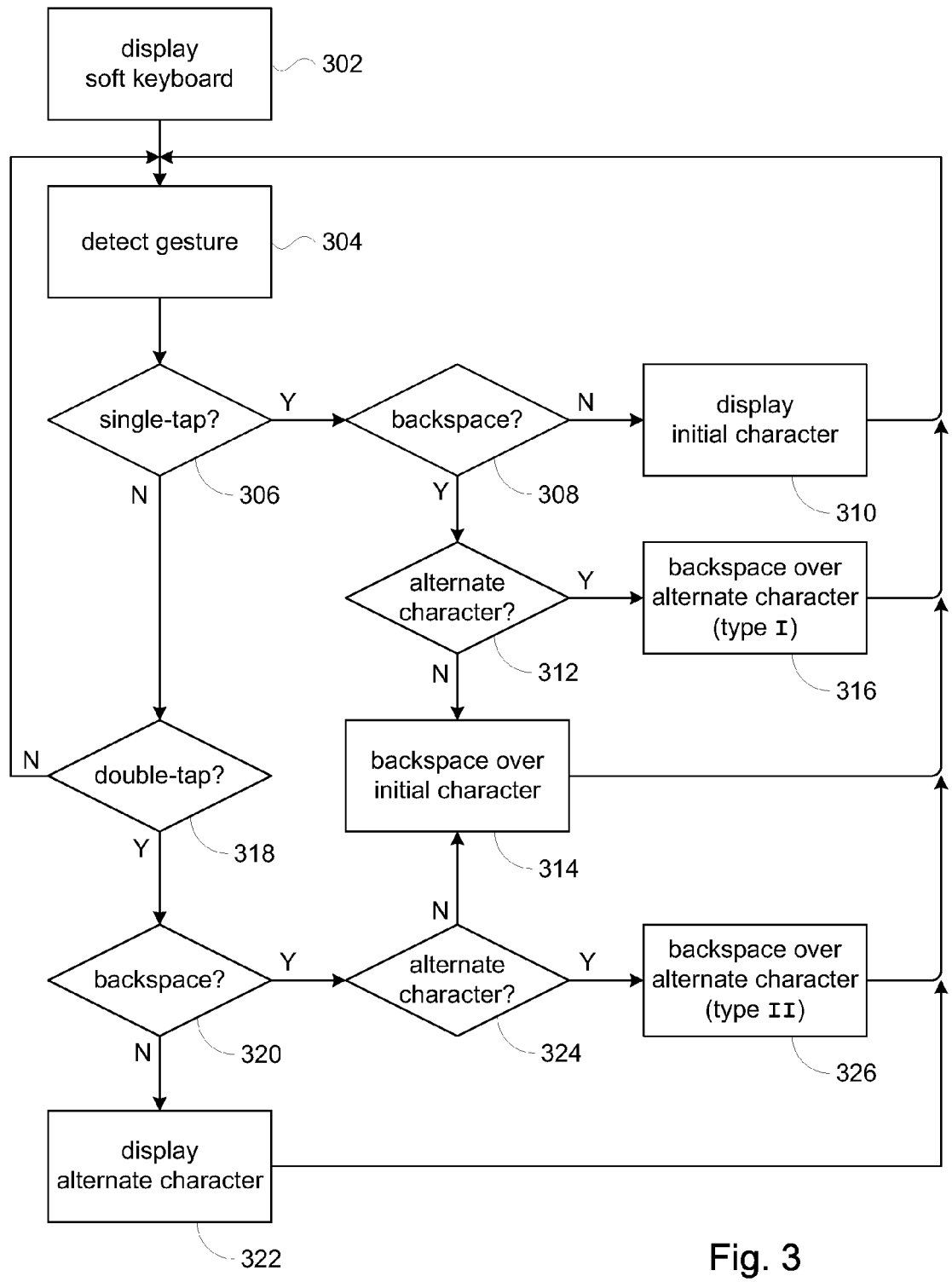
FIG. 3 illustrates processing in accordance with other embodiments of the present disclosure.

Referring to FIG. 3, in some embodiments, the computing device 100 may handle backspace processing depending on whether the BACKSPACE key was single-tapped or double-tapped. By comparison, backspace processing in accordance with the process of FIG. 2 does not take into account whether the BACKSPACE key was single-tapped or double-tapped. The process in FIG. 3 may begin at 302, at which the computing device 100 displays a soft (virtual) keyboard 112a on the touchscreen display 102. At 304, the computing device 100 may detect a gesture performed on a softkey of the soft keyboard 112a.

If, at 306, the computing device 100 detects a single-tap gesture, then processing proceeds to 308, where the computing device may determine whether the single-tap gesture was performed on a BACKSPACE key. If not, then at 310, the computing device 100 may display the initial character associated with the softkey on which the gesture (detected at 304) was made, for example, in the manner explained above.

If, at 308, the single-tap gesture was performed on the BACKSPACE key, then at 312, the computing device 100 may determine whether the character to be backspaced over is an initial character (e.g., displayed per processing at 310) or an alternate character (e.g., displayed per processing of 322). If the displayed character is an initial character, then at 314, the computing device 100 may backspace over the initial character, as explained above; e.g., the displayed character is deleted from the touchscreen display 102. If the displayed character is an alternate character, then at 316, the computing device 100 may backspace over the alternate character in one of the ways described above. For instance, the computing device 100 may replace the alternate character with the corresponding initial character.

Returning to the processing at 306, if the gesture detected at 304 is not single-tap gesture, then at 318, the computing device 100 may determine whether the gesture was a double-tap gesture. If not, then processing from 318 may loop back to 304 for the next detected gesture. Otherwise, at 320, if the double-tap gesture was not performed on the BACKSPACE key, then at 322, the computing device 100 may display the alternate character associated with the softkey on which the gesture (detected at 304) was made, for example, in the manner explained above.

On the other hand, if at 320 the double-tap gesture was performed on the BACKSPACE key, then at 324, the computing device 100 may determine whether the character to be backspaced over is an initial character (e.g., displayed per processing at 310) or an alternate character (e.g., displayed per processing of 322). If the previously displayed character is an initial character, then at 314, the computing device 100 may backspace over the initial character, as explained above. If the previously displayed character is an alternate character, then at 326, the computing device 100 may backspace over the alternate character in one of the ways described above. For example, the computing device 100 may replace the alternate character with two instance of the corresponding initial character. In some embodiments, the backspace processing at 316 may be different from the backspace processing at 326, thus allowing for different backspace processing depending on whether the BACKSPACE key was single-tapped or double-tapped.

FIGS. 4A-4C graphically illustrate inputting and displaying initial and alternate characters in accordance with the present disclosure. FIG. 4A shows the user has tapped the text "This is" in the display area 112b of the computing device 100. FIG. 4A illustrates the user performing a gesture on the softkey for letter 'a' on the soft keyboard 112a.

FIG. 4B illustrates an example, in which the gesture is a single-tap gesture on the softkey for letter 'a'. In accordance with the present disclosure, the computing device 100 may display the initial character associated with the softkey. For example, the initial character associated with the softkey for letter 'a' may be the lower case of the letter. Accordingly, as illustrated in FIG. 4B, the character 'a' may be displayed in the text appearing in the display area 112b, namely "This is a".

FIG. 4C illustrates an example, in which the gesture is a double-tap gesture on the softkey for letter 'a'. In accordance with the present disclosure, the computing device 100 may display the alternate character associated with the softkey. For example, the alternate character associated with the softkey for letter 'a' may be the upper case of the letter. Accordingly, as illustrated in FIG. 4C, the character 'A' may be displayed in the text appearing in the display area 112b, namely "This is A".

Figure 4D:
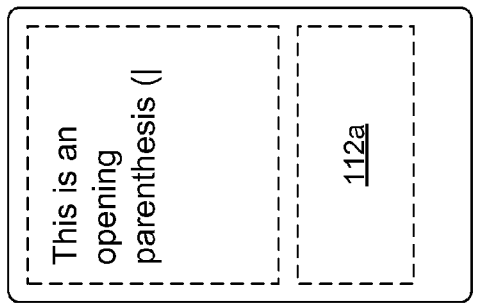
Figure 4G:
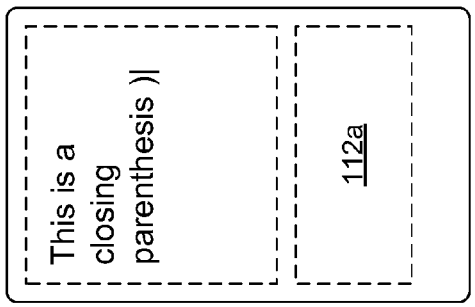
Figure 4E:
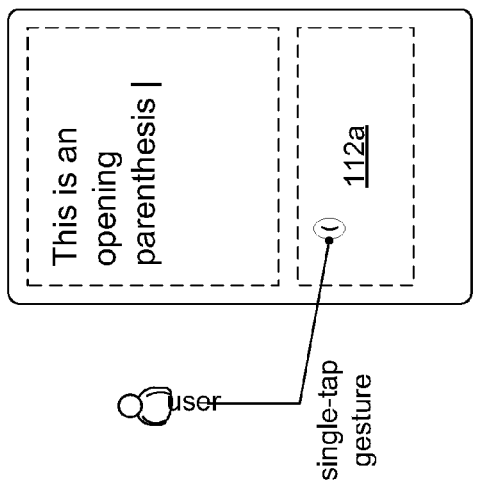
Figure 4H:
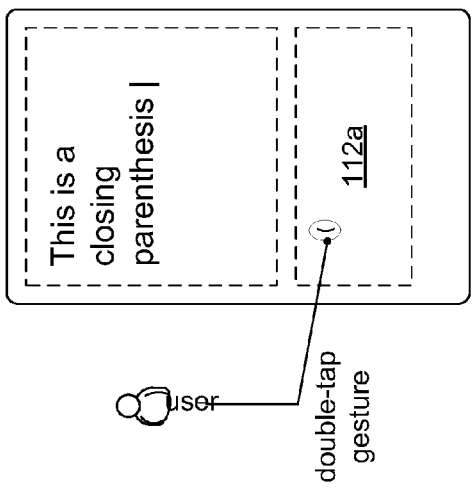
Figure 4F:
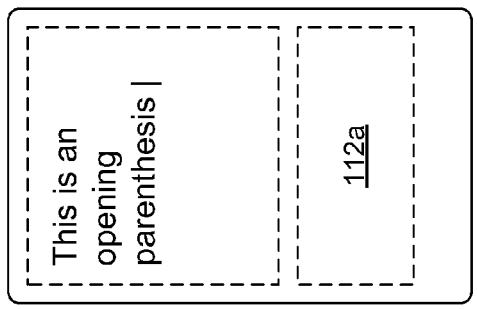

FIGS. 4D-4F and FIGS. 4G-4I illustrate an example for a non-letter key. FIGS. 4D-4F show a sequence wherein the user performs a single-tap gesture on the opening (left) parenthesis softkey, thereby accessing the initial character that is associated with the softkey. In this example, the initial character that is associated with the opening parenthesis softkey is the character '('. FIG. 4D illustrates a starting point, where the user has typed "This is an opening parenthesis". FIG. 4E, illustrates the user performing a single-tap gesture on the opening parenthesis softkey. The resulting display of text in the sequence, shown in FIG. 4F, may be "This is an opening parenthesis (", in which the computing device 100 outputs the initial character '(' in response to the single-tap gesture.

Figure 4I:
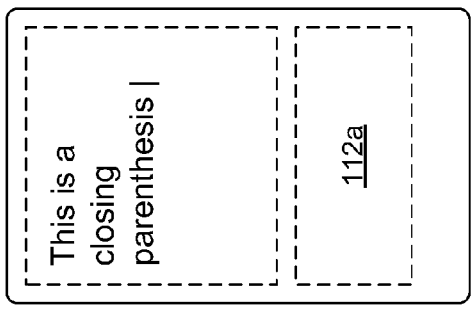

FIGS. 4G-4I show a sequence wherein the user performs a double-tap gesture on the opening parenthesis softkey, thereby accessing the alternate character that is associated with the softkey. In this example, the alternate character that is associated with the opening parenthesis softkey is the character ')'. FIG. 4G illustrates a starting point, where the user has typed "This is a closing parenthesis". FIG. 4H, illustrates the user performing a double-tap gesture on the opening parenthesis softkey. The resulting display of text in the sequence, shown in FIG. 4I, may be "This is a closing parenthesis )", in which the computing device 100 outputs the alternate character ')' in response to the double-tap gesture.

FIGS. 5A-5D graphically illustrate an example of backspace processing in accordance with the present disclosure. FIG. 5A illustrates a starting point for the example using the text "This is A" displayed in the display area 112b, where the letter 'A' is an alternate character displayed as a result of a double-tap gesture. FIG. 5A shows the user either single-tapping or double-tapping a BACKSPACE key. As explained above, in some embodiments, backspacing over an alternate character may result in displaying two instances of the corresponding initial character. FIGS. 5A and 5B illustrate an example, where the letter 'A' is the alternate character over which the user has backspaced. The resulting text in the display area in FIG. 5B is "This is aa", in which the computing device 100 replaces the alternate character with two instances of the initial character 'a'. The sequence from FIGS. 5B to 5C and the sequence from FIGS. 5C to 5D illustrate the effect of subsequent single-tap gestures performed on the BACKSPACE key, namely deleting each instance of the initial character 'a'.

FIGS. 6A and 6B illustrate another example of backspace processing in accordance with the present disclosure. The sequence shown in the figures begins with FIG. 6A, in which the text "This is A" displayed in the display area 112b and where the letter 'A' is an alternate character displayed as a result of a double-tap gesture. In some embodiments, as shown in FIG. 6B, a gesture performed on the BACKSPACE key may result in replacing the alternate character (here, 'A') with its corresponding initial character (here, 'a').

FIGS. 7A and 7B illustrate yet another example of backspace processing in accordance with the present disclosure. The sequence shown in the figures begins with FIG. 7A, in which the text "This is A" displayed in the display area 112b and where the letter 'A' is an alternate character displayed as a result of a double-tap gesture. In some embodiments, as shown in FIG. 7B, a gesture performed on the BACKSPACE key may result in deleting the alternate character (here, 'A').

Figure 8A:
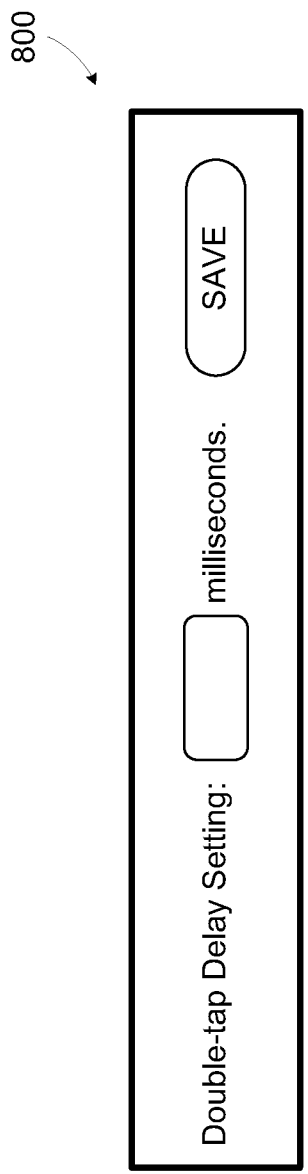
FIGS. 8A and 8B illustrate examples for configuring double-tap delay.
Figure 8B:
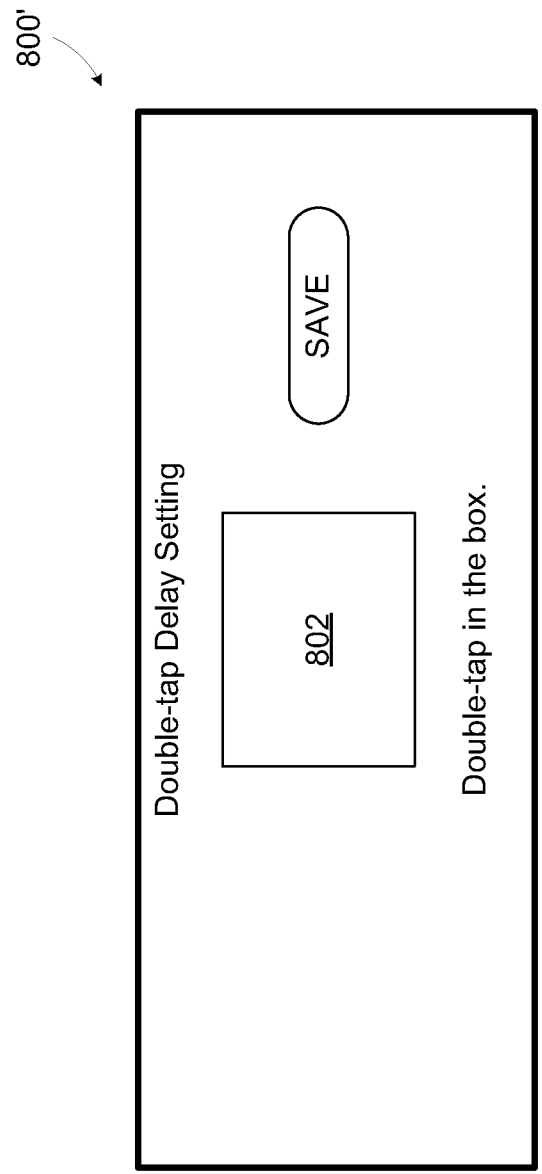

Referring to FIGS. 8A and 8B, in some embodiments, the user may configure a double-tap delay value for the double-tap gesture. A double-tap gesture may comprise two consecutive single touches on the touchscreen display 102, separated by an amount of time called the double-tap delay. If the amount of time between two consecutive single touches exceeds the double-tap delay, the computing device 100 may detect two single-tap gestures. If the amount of time between two consecutive single touches is less than or equal to the double-tap delay, the computing device 100 may detect one double-tap gesture.

The computing device 100 may include a configuration utility that allows the user to set the double-tap delay value. As illustrated in FIG. 8A, in some embodiments, an interface 800 may allow the user to specify the delay time, for example, in milliseconds. In other embodiments, as illustrated in FIG. 8B, an interface 800' may allow the user to set the double-tap delay value by making an actual double-tap gesture in a test area 802 in the interface. For example, the first tap may start a clock, and the second tap may stop the clock. The elapsed time between the first tap and the second tap may be used as the double-tap delay value.

Figure 9:
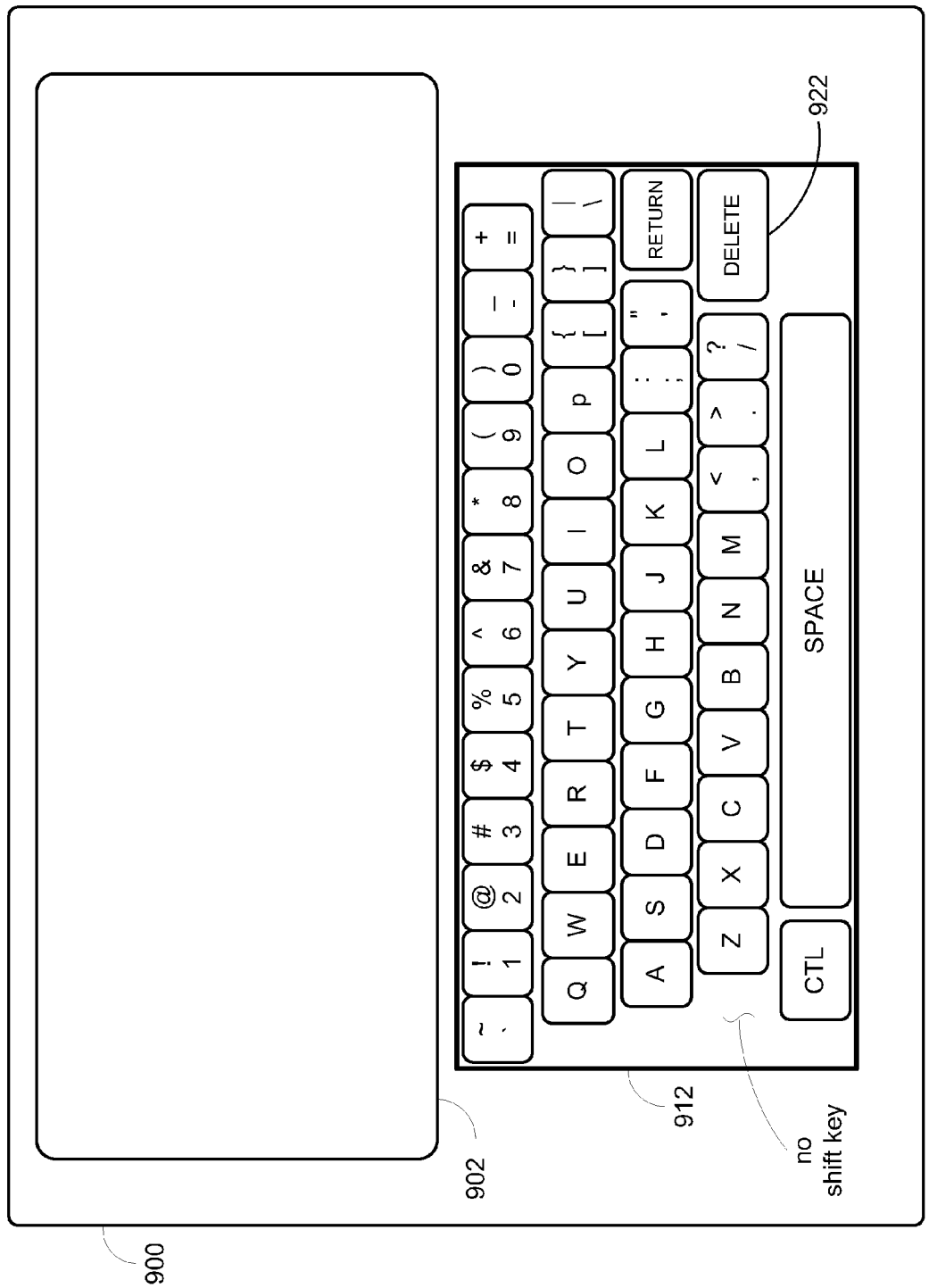
FIG. 9 illustrates an example of a computing device having a hard keyboard.

Referring to FIG. 9, in some embodiments, a computing device 900 may include a display 902 and a hard keyboard 912, instead of a soft (virtual) keyboard. The computing device 900 may be a computer tablet, a smart phone, or some other mobile computing device. The processing of single-tap gestures and double-tap gestures described above for soft keyboards may be applied to a hard keyboard such as shown in FIG. 9. In some embodiments, a user's key strokes on the hard keyboard 912 may correspond to gestures on the softkeys of a soft keyboard. For example, a single-tap gesture on the hard keyboard 912 may be a single strike of a key on the hard keyboard, and a double-tap gesture on the hard keyboard may be a double strike of a key on the hard keyboard.

Figure 10:
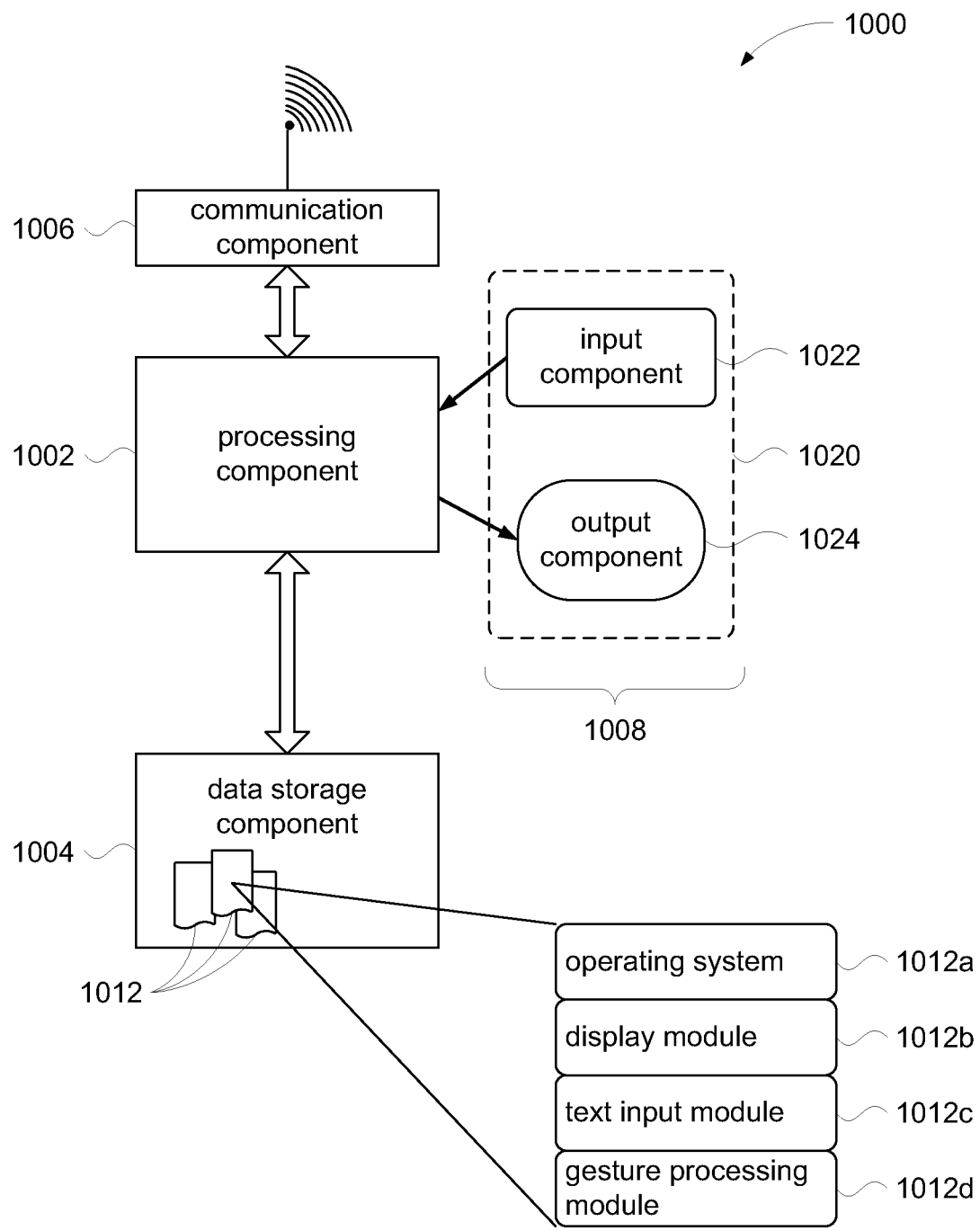
FIG. 10 illustrates an implementation of computing device in accordance with the present disclosure.

Referring to FIG. 10, an illustrative implementation of a computing device 1000 (e.g., computing device 100 in FIG. 1, or computing device 900 in FIG. 9) in accordance with the present disclosure may include a processing component 1002 such as a microcontroller. A data storage component 1004 may comprise static memory (e.g., flash random access memory), dynamic memory (dynamic random access memory, DRAM), a suitable form of non-transitory computer readable medium, and so on. The computing device 1000 may include an input/output (IO) section 1008. A communication component 1006 may provide wireless communication capability, although wired communication is also possible.

In some embodiments, the IO section 1008 may comprise a touch sensitive device 1020 (e.g., touchscreen display 102 in FIG. 1), as might be found in computing tablets, smart phones, and the like. The input component 1022 may be a virtual device (e.g., soft keyboard 112a) displayed on the touchscreen device 1020. Likewise, the output component 1024 may be a display area (e.g., display area 112b) on the touch sensitive device 1020.

In other embodiments, the computing device 1000 may not use a touch sensitive device. Accordingly, the input component 1022 of IO section 1008 may be a hardware input device (e.g., hard keyboard 912). Likewise, the output component 1024 of IO section 1008 may be a display device (e.g., display 902) separate from the input component 1022.

The data storage component 1004 may store executable program code that can be executed by the computing device 1000 to operate in accordance with the present disclosure. For example, the data storage component 1004 may include executable program code 1012, which, when executed by the processing component 1002, may cause the processing component 1002 to perform processing in accordance with the flows shown in FIG. 2 or FIG. 3.

The executable program code 1012 may comprise several modules, including, for example, an operating system 1012a for coordinating and otherwise managing tasks at the system level, communicating among the hardware and software components of the computing device 1000, and the like. A display module 1012b may display text and graphics to a user. For example, if the IO section 1008 comprises a touch sensitive device 1020, then the display module 1012b may generate graphics and text that represent a soft keyboard. The display module 1012b may display text entered by a user in a display area of the touch sensitive device 1020. A text input module 1012c may detect a user's gestures (e.g., single-tap gestures and double-tap gestures) performed on the softkeys of a soft keyboard, or a user's key strikes on the keys of a hard keyboard. A gesture processing module 1012d may cooperate with the text input module 1012c to process detected gestures. The gesture processing module 1012d may determine how to display a character or to erase an already-displayed character. The gesture module 1012 may cooperate with the display module 1012b to update displayed text according the detected gestures.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method performed on a computing device comprising operating a computer processor to perform steps of:
    detecting a first gesture performed on a first key of a keyboard of the computing device;
    determining if the first gesture is a single-tap gesture or a double-tap gesture, wherein
        if the first gesture is a single-tap gesture, then displaying a first character corresponding to the first key at a first position on a display of the computing device,
        if the first gesture is a double-tap gesture, then displaying a second character that is different from the first character at the first position on the display; and
    detecting a second gesture performed on a second key of the keyboard and in response thereto, if the second character is displayed, then deleting the second character from the display and displaying the first character in the display in place of the second character.

2. The method of claim 1 wherein the display is a touchscreen display, the method further comprising displaying a soft keyboard on the touchscreen display as the keyboard.

3. The method of claim 2 wherein the soft keyboard displayed on the touchscreen device comprises a display of letter keys representative of an alphabet and the first key is a letter key.

4. The method of claim 2 wherein the soft keyboard displayed on the touchscreen device comprises a display of non-letter keys and the first key is a non-letter key.

5. The method of claim 1 wherein the first gesture is determined to be a double-tap gesture when two consecutive single-tap gestures have been performed within a predetermined period of time.

6. The method of claim 1 wherein the keyboard is absent a SHIFT key.

7. The method of claim 1 wherein:
the first key is a letter key representative of a letter,
the first character is a lower case representation of the letter, and
the second character is an upper case representation of the letter.

8. The method of claim 1 wherein the second gesture is a single tap gesture or a double tap gesture.

9. The method of claim 1 wherein the second gesture is a single tap gesture or a double-tap gesture.

10. A computing device comprising:
a computer processor;
a display; and
memory having stored thereon computer executable program code, which, when executed by the computer processor, causes the computer processor to:
  detect a first gesture performed on a first key of a keyboard of the computing device;
  determine if the first gesture is a single-tap gesture or a double-tap gesture, wherein
    if the first gesture is a single-tap gesture, then display a first character corresponding to the first key at a first position in the display of the computing device,
    if the first gesture is a double-tap gesture, then display a second character that is different from the first character at the first position in the display; and
  detect a second gesture performed on a second key of the keyboard and in response thereto, if the second character is displayed, then delete the second character from the display and display two instances of the first character in the display in place of the second character.

11. The computing device of claim 10 wherein:
the display is a touchscreen display, and
the computer executable program code, which, when executed by the computer processor, further causes the computer processor to display a soft keyboard on the touchscreen display as the keyboard.

12. The computing device of claim 10 wherein the keyboard is absent a SHIFT key.

13. The computing device of claim 10 wherein:
the first key is a letter key representative of a letter,
the first character is a lower case representation of the letter, and
the second character is an upper case representation of the letter.

14. A non-transitory computer readable medium having stored thereon computer executable program code, which, when executed by a computing device, causes the computing device to perform steps of:
  detecting a first gesture performed on a first key of a keyboard of the computing device;
  determining if the first gesture is a single-tap gesture or a double-tap gesture, wherein
    if the first gesture is a single-tap gesture, then displaying a first character corresponding to the first key at a first position on a display of the computing device,
    if the first gesture is a double-tap gesture, then displaying a second character that is different from the first character at the first position in the display
  detecting a second gesture performed on a second key of the keyboard and in response thereto, if the second character is displayed, then
    if the second gesture is a single-tap, then displaying the first character in the display in place of the second character,
    if the second gesture is a double-tap, then displaying two instances of the first character in the touchscreen display in place of the second character.

15. The non-transitory computer readable medium of claim 14 wherein the display is a touchscreen display, wherein the computer executable program code, which, when executed by a computing device, further causes the computing device to perform steps of displaying a soft keyboard on the touchscreen display as the keyboard.

16. The non-transitory computer readable medium of claim 14 wherein:
the first key is a letter key representative of a letter,
the first character is a lower case representation of the letter, and
the second character is an upper case representation of the letter.

* * * * *